United States Patent
Verall et al.

(10) Patent No.: US 7,582,227 B2
(45) Date of Patent: Sep. 1, 2009

(54) OPTICAL FILM INSIDE A LIQUID CRYSTAL DISPLAY

(75) Inventors: Mark Verall, Shilin (TW); Andrew Ann Cumming, Dorset (GB); Richard Harding, Hants (GB); Owain Llyrr Parri, Ringwood (GB)

(73) Assignee: Merck Patent GmbH, Darmstadt (DE)

(*) Notice: Subject to any disclaimer, the term of this patent is extended or adjusted under 35 U.S.C. 154(b) by 660 days.

(21) Appl. No.: 10/552,711

(22) PCT Filed: Mar. 8, 2004

(86) PCT No.: PCT/EP2004/002342

§ 371 (c)(1),
(2), (4) Date: Oct. 7, 2005

(87) PCT Pub. No.: WO2004/090024

PCT Pub. Date: Oct. 21, 2004

(65) Prior Publication Data

US 2006/0193999 A1    Aug. 31, 2006

(30) Foreign Application Priority Data

Apr. 8, 2003 (EP) .................. 03007918

(51) Int. Cl.
*C09K 19/00* (2006.01)
*C09K 19/06* (2006.01)
*C09K 19/52* (2006.01)

(52) U.S. Cl. ............ 252/299.01; 430/20; 428/1.1; 428/1.3

(58) Field of Classification Search ............ 428/1.1, 428/1.3; 252/299.01; 430/20
See application file for complete search history.

(56) References Cited

U.S. PATENT DOCUMENTS

2006/0193998 A1* 8/2006 Harding et al. ............ 428/1.1

FOREIGN PATENT DOCUMENTS

| EP | 0 699 938 A | 3/1996 |
|---|---|---|
| EP | 0 816 905 A | 1/1998 |
| JP | 4-12324 A | 1/1992 |
| JP | 8-76148 A | 3/1996 |
| JP | 2004-240102 A | 8/2004 |
| WO | WO 98/12584 A | 3/1998 |

* cited by examiner

*Primary Examiner*—Geraldina Visconti
(74) *Attorney, Agent, or Firm*—Millen, White, Zelano, Branigan, P.C.

(57) ABSTRACT

The invention relates to an optical film for use in a liquid crystal display that is positioned inside the liquid crystal cell of the display comprising the switchable liquid crystal material, and to an LCD comprising such a film.

19 Claims, 2 Drawing Sheets

OPTICAL FILM INSIDE A LIQUID CRYSTAL DISPLAY

FIELD OF THE INVENTION

The invention relates to an optical film for use in a liquid crystal display where it is positioned inside the liquid crystal cell comprising the switchable liquid crystal material, and to a liquid crystal display comprising such a film.

BACKGROUND AND PRIOR ART

Liquid Crystal Displays (LCDs) are widely used to display information. LCDs are used for direct view displays, as well as for projection type displays. Electro-optical modes employed are e.g. the twisted nematic mode (TN), the super twisted nematic mode (STN), the optically compensated bend mode (OCB), the electrically controlled birefringence mode (ECB), or the vertically aligned mode (VA) with their various modifications, using an electrical field which is substantially perpendicular to the substrates, respectively to the liquid crystal (LC) layer. Furthermore, there are electro-optical modes employing an electrical field substantially parallel to the substrates, respectively to the LC layer, like for example the In-Plane Switching mode (IPS).

A new type of LCDs is disclosed in WO 02/93244 A1 and DE 10217273 A1 and comprises an LC cell with an electrically switchable LC medium that is operated in an optically isotropic phase, for example the blue phase or the isotropic phase, where it becomes birefringent when an electric field is applied due to the Kerr effect. Interdigitated electrodes on one side of the LC cell create an in-plane electric field parallel to the plane of the cell, which aligns the LC molecules in a planar texture along the electric field lines. These LCDs are hereinafter also referred to as "isotropic mode LCD".

Another new type of LCDs is disclosed in WO 01/07962. It contains an LC switching cell comprising at least one polariser and an LC medium which has an initial alignment where the LC molecules are aligned essentially parallel to the cell substrates and are essentially untwisted, i.e. essentially parallel or antiparallel to one another. The LC molecules are realigned from their initial alignment by a corresponding electric field. In case of LC materials of negative dielectric anisotropy, the electric field is aligned essentially parallel to the substrates. In case of LC materials of positive dielectric anisotropy the electric field is aligned essentially perpendicular to the substrates. These LCDs are hereinafter also referred to as "new mode LCD".

Further known display types are for example scattering displays, guest-host displays or cholesteric displays like SSCT (surface stabilized cholesteric texture).

LCDs can be operated as multiplexed or matrix displays. Typical examples of multiplexed displays are TN and STN displays. Typical examples of matrix displays are TN, IPS, OCB, ECB or VA displays. In matrix LCDs (MLCD), examples of nonlinear elements which can be used to individually switch the individual pixels are active elements like transistors. This is then referred to as an "active matrix". A differentiation can be made between two types:
1. MOS (metal oxide semiconductor) transistors on silicon wafers as substrate,
2. Thin-film transistors (TFT) on a glass plate as substrate.

In the case of type 1, the electro-optical effect used is usually dynamic scattering or the guest-host effect. The use of monocrystalline silicon as substrate material restricts the display size, since even the modular assembly of various part-displays results in problems at the joins.

In the case of type 2, which is preferred, the electro-optical effect used is for example the TN or IPS effect. A distinction can be made between two technologies: TFTs comprising compound semiconductors, such as, for example, CdSe, or TFTs based on polycrystalline or amorphous silicon. Intensive research efforts are being made worldwide in the latter technology.

The TFT matrix is applied to the inside of one glass plate of the display, while the inside of the other glass plate carries for example the transparent counterelectrode. Compared with the size of the pixel electrode, the TFT is very small and has virtually no adverse effect on the image. This technology can also be extended to fully colour-compatible image displays, in which a mosaic of red, green and blue filters is arranged in such a manner that each filter element is located opposite a switchable pixel.

The term MLCD as used here covers any matrix display containing integrated nonlinear elements, i.e. in addition to the active matrix, also displays containing passive elements such as varistors or diodes (MIM=metal-insulator-metal).

MLCDs are particularly suitable for monitor or TV applications or for high-information displays e.g. in automobile or aircraft construction.

One drawback of LCDs is that they often show a limited viewing angle performance. For example, in specific directions the dark state of the display exhibits light leakage which results in contrast reduction. Also, the light state luminance is often reduced and colouration can occur. Furthermore, the contrast especially at large viewing angles is often limited which is a disadvantage especially in large area applications such as monitors and television.

Therefore, typically one or more optical retardation or compensation films are applied to the LCDs in order to compensate for light-leakage and to improve the LCD properties like the viewing angle characteristics, luminance, contrast and colour.

Typical retardation films of prior art comprise optically isotropic polymers like polyethyleneterephthalate (PET), polyvinylalcohol (PVA) or polycarbonate (PC), or slightly birefringent polymers like di- or triacetylcellulose (DAC, TAC), which become birefringent or wherein the birefringence is increased due to uniaxial stretching or compression.

Particularly suitable as compensators or retarders are anisotropic polymer films comprising a polymerised or crosslinked LC material with uniform orientation, like for example films with planar, homeotropic, tilted, splayed or helically twisted orientation. Such films and their use as compensators in LCDs are described for example in WO 98/04651 (planar films), WO 98/00475 (homeotropic films), WO 98/12584 (tilted and splayed films), GB-A-2 315 072 and WO 01/20394 (helically twisted films). Compensators comprising combinations of such films are disclosed for example in WO 01/20392, WO 01/20393, WO 01/20394 and WO 01/20395.

The retardation or compensation films are typically positioned in an LCD device between the polarisers and the display cell that comprises the switchable LC medium. They can also be laminated onto the polarisers. However, the use of such retardation films increases the total thickness of the device, and increases the manufacturing efforts and costs for the production of the display. Moreover, a display where the optical retardation film is attached outside the substrates forming the LC cell usually suffers from parallax problems, which can severely impair viewing angle properties.

One aim of the present invention is to provide optical retardation films for use in LCDs, and to provide LCDs, which do not have the drawbacks mentioned above. Other aims of the invention are immediately evident to those skilled in the art from the following description.

It was found that these aims can be achieved, and the above mentioned drawbacks can be avoided by placing an optical retardation film not outside the switchable LC cell of the LCD, but between the substrates forming the switchable LC cell and containing the switchable LC medium ("incell application"). It was also found that particularly suitable for such incell application is a film comprising polymerised LC material.

DEFINITION OF TERMS

In connection with polarisation, compensation and retardation layers, films or plates as described in the present application, the following definitions of terms as used throughout this application are given.

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. Liquid crystal (LC) compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerised.

For the sake of simplicity, the term 'liquid crystal material' is used hereinafter for both liquid crystal materials and mesogenic materials, and the term 'mesogen' is used for the mesogenic groups of the material.

The term 'reactive mesogen' (RM) means a polymerisable mesogenic compound.

The term 'director' is known in prior art and means the preferred orientation direction of the long molecular axes (in case of calamitic compounds) or short molecular axis (in case of discotic compounds) of the mesogens in a liquid crystal material.

The term 'planar structure' or 'planar orientation' refers to a film wherein the optical axis is substantially parallel to the film plane.

The term 'homeotropic structure' or 'homeotropic orientation' refers to a film wherein the optical axis is substantially perpendicular to the film plane, i.e. substantially parallel to the film normal.

The terms 'tilted structure' or 'tilted orientation' refers to a film wherein the optical axis is tilted at an angle θ between 0 and 90 degrees relative to the film plane.

The term 'splayed structure' or 'splayed orientation' means a tilted orientation as defined above, wherein the tilt angle additionally varies monotonuously in the range from 0 to 90°, preferably from a minimum to a maximum value, in a direction perpendicular to the film plane.

The tilt angle of a splayed film hereinafter is given as the average tilt angle $\theta_{ave}$, unless stated otherwise.

The average tilt angle $\theta_{ave}$ is defined as follows $$\theta_{ave} = \frac{\sum_{d'=0}^{d} \theta'(d')}{d}$$

wherein $\theta'(d')$ is the local tilt angle at the thickness d' within the film, and d is the total thickness of the film.

In planar, homeotropic and tilted optical films comprising uniaxially positive birefringent liquid crystal material with uniform orientation, the optical axis of the film is given by the director of the liquid crystal material.

The term 'helically twisted structure' relates to a film comprising one or more layers of liquid crystal material wherein the mesogens are oriented with their main molecular axis in a preferred direction within molecular sublayers, said preferred orientation direction in different sublayers being twisted at an angle φ around a helix axis. The term 'helically twisted structure with planar orientation' means a film with helically twisted structure as described above, wherein the helix axis is substantially perpendicular to the film plane, i.e. substantially parallel to the film normal.

The term 'A plate' refers to an optical retarder utilizing a layer, of uniaxially birefringent material with its extraordinary axis oriented parallel to the plane of the layer.

The term 'C plate' refers, to an optical retarder utilizing a layer of uniaxially birefringent material with its extraordinary axis perpendicular to the plane of the layer.

The term 'O plate' refers to an optical retarder utilizing a layer of a uniaxially birefringent material with its extraordinary axis oriented at an oblique angle with respect to the plane of the layer.

In A-, C- and O-plates comprising optically uniaxial birefringent liquid crystal material with uniform orientation, the optical axis of the film is given by the direction of the extraordinary axis.

An A-, C- or O plate comprising optically uniaxial birefringent material with positive birefringence is also referred to as '+A/C/O plate' or 'positive A/C/O plate'. An A-, C- or O plate comprising a film of optically uniaxial birefringent material with negative birefringence is also referred to as '−A/C/O plate' or 'negative A/C/O plate'.

An A plate or C plate comprising optically uniaxial birefringent material with positive birefringence is also referred to as '+A/C plate' or 'positive A/C plate'. An A plate or C plate comprising a film of optically uniaxial birefringent material with negative birefringence is also referred to as '−A/C plate' or 'negative A/C plate'.

A retardation film with positive or negative birefringence is also shortly referred to as 'positive' or 'negative' retardation film, respectively.

A transmissive or transflective LCD according to the present invention preferably contains a polariser and an analyser, which are arranged on opposite sides of the arrangement of LC layer and birefringent layer.

Polariser and Analyser are jointly referred to as "polarisers" in this application.

SUMMARY OF THE INVENTION

The present invention relates to an optical retardation film for use in a liquid crystal display (LCD) device, characterized in that said film is positioned inside the switchable liquid crystal cell of said LCD.

The present invention further relates to a liquid crystal display (LCD) comprising a liquid crystal (LC) cell formed by two plane parallel substrates at least one of which is transparent to incident light, a liquid crystal medium which is present between the two substrates, and at least one optical retardation film, characterized in that at least one of said optical retardation films is positioned between the two substrates of the LC cell.

DETAILED DESCRIPTION OF THE INVENTION

Figure 1:
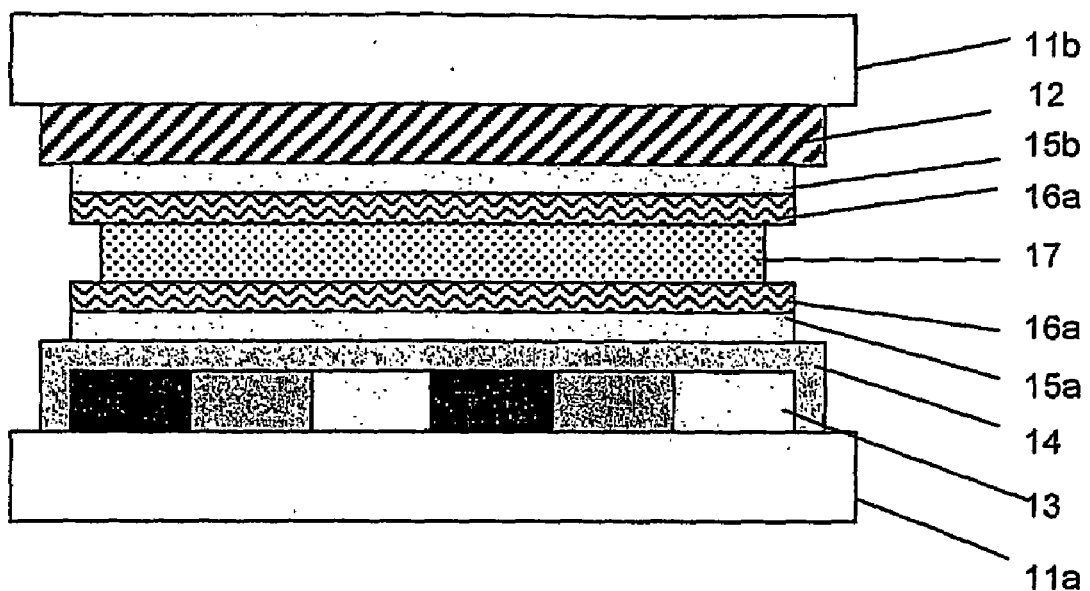
FIG. 1 schematically depicts an active-matrix colour LCD of prior art.

A typical LC cell of an active matrix LCD device of prior art is shown in FIG. 1, comprising two plane parallel substrates (11a, 11b) which are typically glass plates, a thin film transistor (TFT) array (12), a colour filter array (13) with a planarisation layer (14), electrode layers (15a, 15b) which are typically layers of indium tin oxide (ITO), alignment layers (16a, 16b) for example of rubbed polyimide, and an LC medium (17) wherein the LC molecules are aligned into uniform orientation and can be switched into a different orientation by application of an electric field.

An LCD according to the present invention comprises an optical retardation film not outside the switchable LC cell of the LCD, but between the substrates forming the switchable LC cell and containing the switchable LC medium ("incell application"). Compared to conventional displays where the optical retarders are usually placed between the LC cell and the polarisers, incell application of an optical retardation film has several advantages. For example, parallax problems can be reduced or even avoided. Furthermore, this allows to reduce the total thickness of the LCD device which is an important advantage for flat panel displays. Also, the displays become more robust.

A preferred embodiment of the present invention relates to an LCD comprising
1) a liquid crystal (LC) cell comprising the following elements, starting from the edges to the centre of the cell in the sequence listed below
   a) a first and a second substrate plane (11a, 11b) parallel to each other, at least one of which is transparent to incident light,
   b) optionally an array of nonlinear electric elements (12) on one of said substrates which can be used to individually switch individual pixels of said LC cell, said elements being preferably active elements like transistors, very preferably TFTs,
   c) optionally a colour filter array (13) provided on one of said substrates, preferably on the substrate opposite to that carrying the array of nonlinear elements, said colour filter optionally being covered by a planarisation layer (14),
   d) a first electrode layer (15a or 15b) provided on the inside of said first substrate,
   e) optionally a second electrode layer (15a or 15b) provided on the inside of said second substrate,
   f) optionally first and second alignment layers (16a or 16b) provided on said first and second electrodes,
   g) an LC medium (17) that is switchable between at least two different states by application of an electric field,
2) a first linear polariser on one side of the LC cell,
3) optionally a second linear polariser on the side of the LC cell opposite to that of the first linear polariser, and
4) at least one optical retardation film (18), characterized in that at least one of said optical retardation films (18) is positioned between the first and second substrate (11a, 11b) of the LC cell.

According to a preferred embodiment of the present invention the optical retardation film comprises polymerised or crosslinked LC material.

Such films are particularly suitable for incell application, because they can be made thinner due to the higher birefringence of the LC material compared e.g. to the conventional stretched plastic films. Thus, a film with a thickness of 2 microns or less can be used, which is especially suitable for incell applications. Also, the use of a polymerisable LC material allows to prepare the retardation film directly inside the LC.

Alternatively, but less preferred, it is possible to prepare a film of an LC polymer, for example an LC side chain polymer or an LC network, separately and to apply the LC film onto the substrate or another component of the display cell during manufacture of the LC cell.

Manufacturing an optical film inside an LCD requires very thin films which not only show the required optical properties, but which also have high durability, high adhesion to other components, and stability to other process conditions required for the manufacture of an entire LC display cell. Such properties can be achieved by thin coatings of polymerisable mesogenic or LC materials or LC polymers.

However, in many positions within the LC cell the LC material can suffer from thermal or chemical degradation during the subsequent cell fabrication processes such as colour filter or TFT fabrication, ITO electrode deposition or polyimide processing.

It has been found that by preparing a polymerised LC film on top of the colour filter array structure within an LCD, advantages can be realised in the manufacturing of LCDs.

Therefore, according to a preferred embodiment of the present invention the optical retardation film is positioned between the colour filter and the switchable LC medium.

Figure 2:
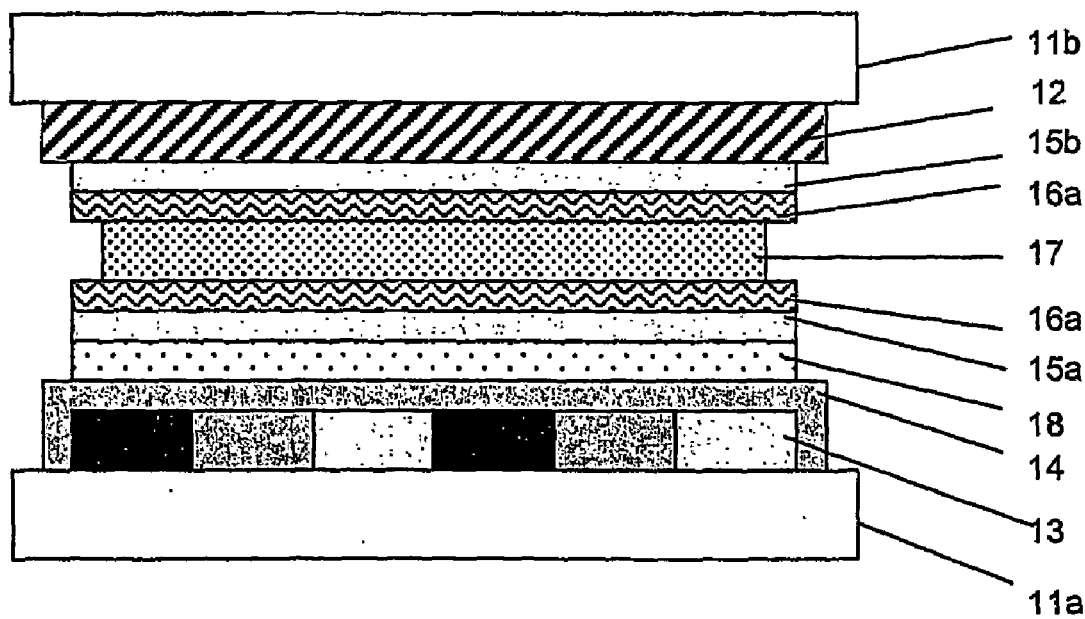
FIG. 2 schematically depicts an active-matrix colour LCD according to the present invention, comprising a colour filter covered with a planarisation layer and an optical retardation film on top of the planarisation layer.

An active matrix LCD according to this preferred embodiment is exemplarily depicted in FIG. 2, comprising two substrates (11a, 11b), a TFT array (12), a colour filter array (13), a planarisation layer (14), electrode layers (15a) and optionally (15b), optionally two alignment layers (16a, 16b), an LC medium (17), and further comprising an optical retardation film (18) positioned between the planarisation layer and the LC medium. Optionally, another alignment layer (16c, not shown) is present between the optical retardation film (18) and the planarisation layer (14).

Depending on the display mode, the alignment layer (16a) and/or (16b), and one of the electrode layers (15a) and (15b) (for example in an IPS display) may also be omitted.

It is especially preferred to prepare the optical retardation film (18) from a polymerisable LC material, and to use the top-coat or planarisation layer (14), which is normally present on the colour filter array (13), as the substrate for direct application of the polymerised LC film. By careful selection of the planarisation layer the polymerisable LC layer can be aligned and polymerised directly without the need for an additional alignment layer.

Figure 3:
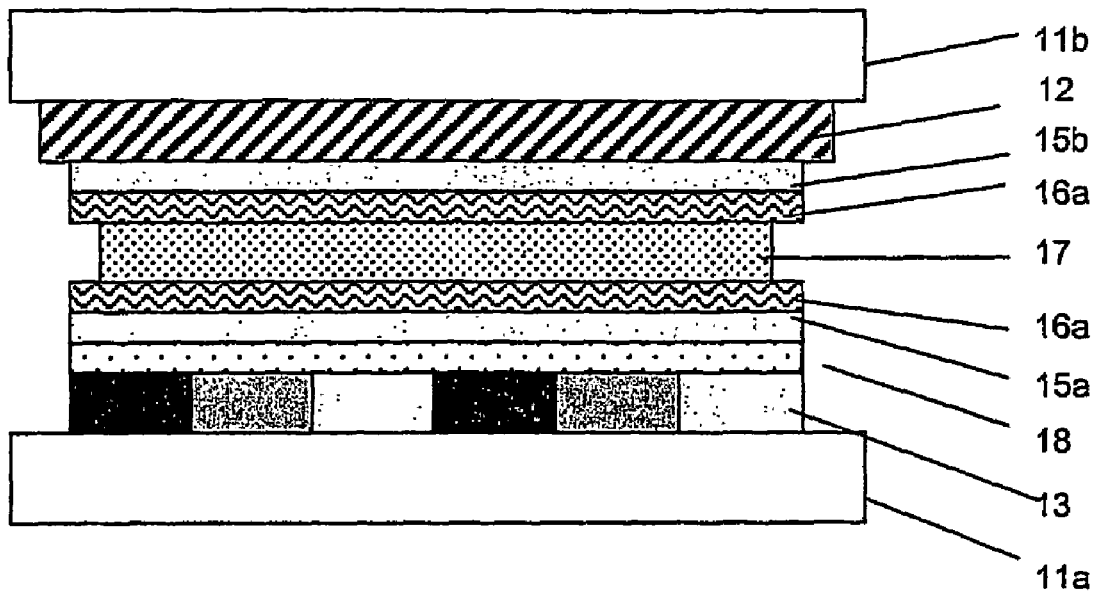
FIG. 3 schematically depicts an active-matrix colour LCD according to the present invention, comprising a colour filter and an optical retardation film on top of the colour filter.

In another preferred embodiment, as exemplarily shown in FIG. 3, the optical retardation film (18) is positioned on the colour filter array (13), optionally covered by an alignment layer, without the presence of a planarisation layer (14). The optical film (18) in this preferred embodiment can also serve as planarisation layer. The optical retardation film (18) is very preferably prepared from a polymerisable LC layer that is aligned and polymerised directly on the colour filter (13) optionally covered by an alignment layer.

Figure 4:
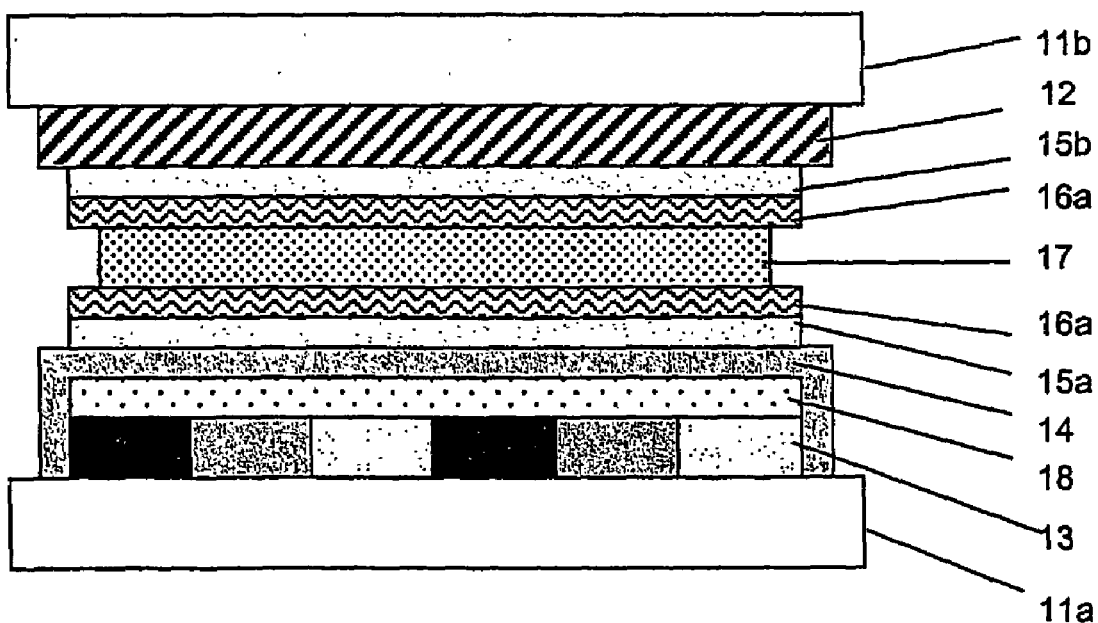
FIG. 4 schematically depicts an active-matrix colour LCD according to the present invention, comprising a colour filter covered with a planarisation layer and an optical retardation film between the colour filter and the planarisation layer.

In yet another preferred embodiment as exemplarily shown in FIG. 4, the optical retardation film (18) is positioned between the colour filter array (13) which is optionally covered by an alignment layer, and the planarisation layer (14):

Furthermore, the LCDs of FIG. 2-4 may also comprise a first and a second linear polariser having crossed polarisation axes and sandwiching the LCD substrates (not shown in FIG. 2-4).

In another preferred embodiment the optical retardation film is a patterned or pixelated film having a pattern comprising at least two regions having different orientation and/or different retardation. Such films can be prepared from polymerisable LC material using for example photoalignment, photomasking techniques and/or photoisomerizable compounds or phototunable chiral materials. Such films and methods of preparing them are known in prior art and described for example in EP-A-1 247 796, EP-A-1 247 797, U.S. Pat. No. 6,144,428, U.S. Pat. No. 6,160,597 and EP 02019792.7.

Patterned optical retardation films are especially useful for incell use in pixelated or matrix LCDs, for example in multiplexed TN- or STN-LCDs or in an active matrix driven (AMD) LCDs. In these displays it is possible to form the patterned optical retardation film such that the optical properties in the different regions of the film, like e.g. the retardation, are adjusted to the pattern of individual pixels in the LCD. In contrast, conventional optical films will only provide an average uniform property for all areas of the display.

In another preferred embodiment the optical retardation film is an optically biaxial film as described for example in PCT/EP02/12393.

Especially preferred are the following embodiments:
the optical retardation film comprises polymerised or crosslinked LC material,
the optical retardation film is positioned on the planarisation layer, on the side facing away from the colour filter array,
the optical retardation film is positioned on the colour filter array, on the side facing away from the nearest substrate,
the optical retardation film is positioned between the colour filter array and the planarisation layer,
the optical retardation film is formed directly on a polymer layer which is itself directly on top of the colour filter array, this polymer layer acting to planarise the surface of the colour filter array (planarisation layer), and optionally also as an alignment surface for the optical film,
the optical retardation film is formed directly on top of the colour filter array, such that the surface of the colour filter array optionally also acts as an alignment surface for the optical film,
optionally an additional polymer layer is provided on top of the optical retardation film to further planarise or protect the optical film before application of the electrode layer,
the optical retardation film is prepared from a polymerisable LC material, preferably a material comprising one or more polymerisable mesogenic or liquid crystal monomers,
the optical retardation film is a planar film,
the optical retardation film is a homeotropic film,
the optical retardation film is a tilted film,
the optical retardation film is a splayed film,
the optical retardation film is a twisted or cholesteric film,
the optical retardation film is a film having twisted or cholesteric structure with reflection of light in the UV range and/or a pitch of less than 250 nm (UV-CLC),
the optical retardation film is a biaxial film having a cholesteric structure and a deformed helix with an elliptical refractive index ellipsoid that reflects light of a wavelength of less than 380 nm,
the optical retardation film is a biaxial film having a cholesteric structure which has optically biaxial negative C symmetry with $n_x \neq n_y \neq n_z$ and $n_x, n_y > n_z$, wherein $n_x$ and $n_y$ are the principal refractive indices in orthogonal directions in the film plane and $n_z$ is the principal refractive index perpendicular to the film plane,
the optical retardation film is a positive or negative A plate, preferably a positive A plate,
the optical retardation film is a positive or negative O plate, preferably a positive O plate,
the optical retardation film is a positive C plate,
the optical retardation film is a negative C plate,
the optical retardation film is an optically biaxial film,
the optical retardation film has a pattern comprising at least two regions having different orientation and/or different retardation,
the optical retardation film is a quarter wave retardation film.

The individual components of the display, like the substrates (11a,b), TFT array (12), colour filter (13), planarisation layer (14), electrodes (15a,b), alignment layers (16a,b) and LC medium (17) are known to the expert and are described in prior art.

The optical retardation film can be prepared from a polymerisable liquid crystal (LC) material as described for example in WO 98/04651 (planar film), WO 98/00475 (homeotropic film), WO 98/12584 (tilted or splayed film), GB-A-2 315 072 and WO 01/20394 (UV-CLC film), EP-A-1 247 796 or EP-A-1 247 797 or EP 02019792.7 (patterned film), or PCT/EP02/12393 (biaxial cholesteric film).

The thickness of an optical retardation film according to the present invention is preferably from 0.5 to 2.5 microns, very preferably from 0.6 to 2 microns, most preferably from 0.7 to 1.5 microns.

The polymerisable LC material is preferably a nematic or smectic LC material, in particular a nematic material, and preferably comprises at least one monoreactive achiral polymerisable mesogenic compound and at least one di- or multireactive achiral polymerisable mesogenic compound.

Polymerizable mesogenic mono-, di- and multireactive compounds used for the present invention can be prepared by methods which are known per se and which are described, for example, in standard works of organic chemistry such as, for example, Houben-Weyl, Methoden der organischen Chemie, Thieme-Verlag, Stuttgart.

Examples of suitable polymerizable mesogenic compounds that can be used as monomers or comonomers together with the compounds according to the present invention in a polymerizable LC mixture, are disclosed for example in WO 93/22397, EP 0 261 712, DE 195 04 224, WO 95/22586, WO 97/00600 and GB 2 351 734. The compounds disclosed in these documents, however, are to be regarded merely as examples that shall not limit the scope of this invention.

Examples of especially useful chiral and achiral polymerizable mesogenic compounds (reactive mesogens) are shown in the following lists which should, however, be taken only as illustrative and is in no way intended to restrict, but instead to explain the present invention:

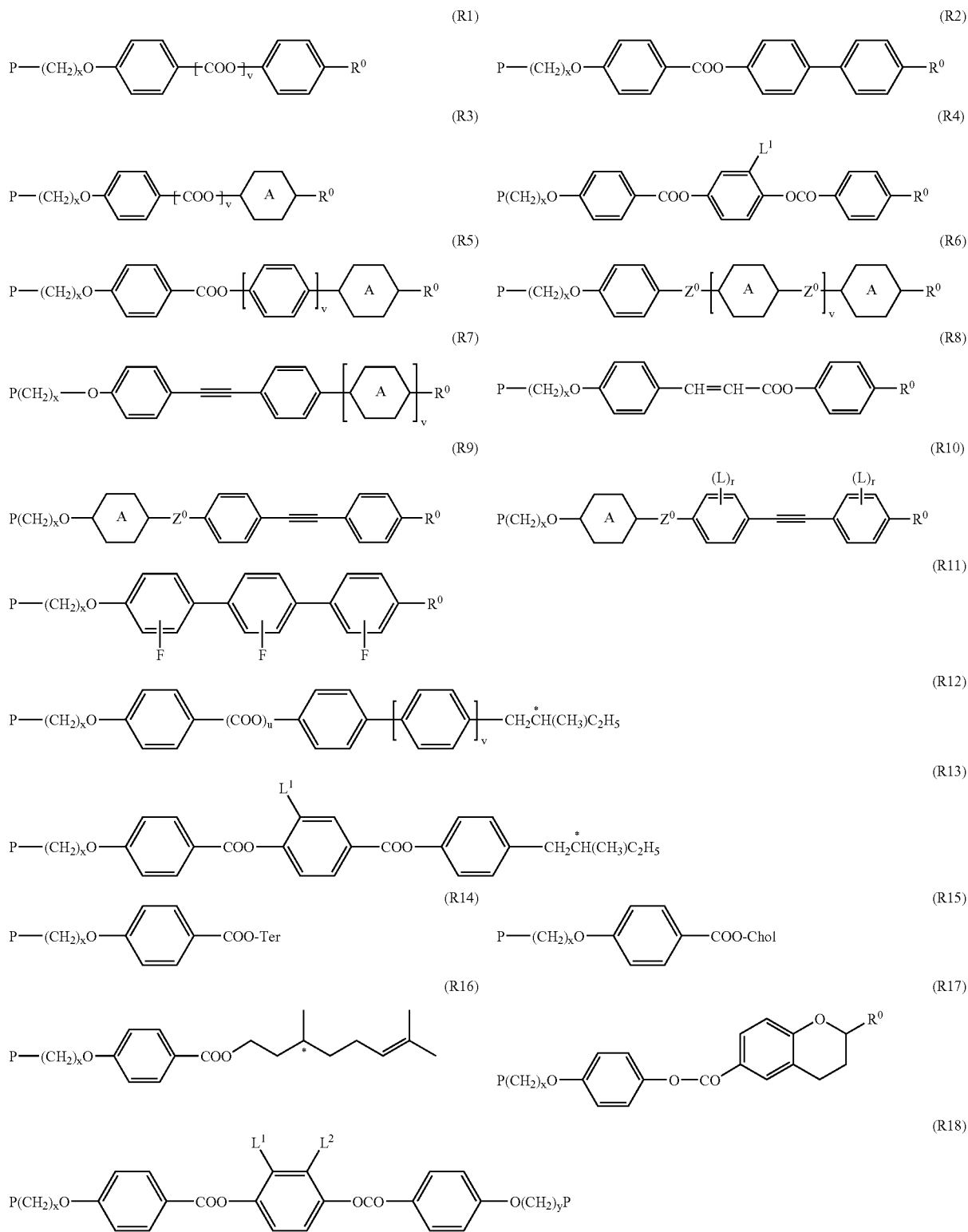

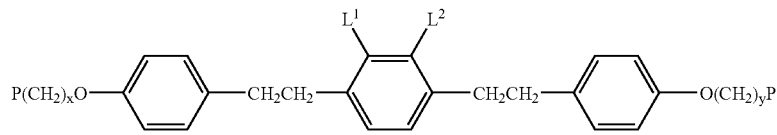
(R19)

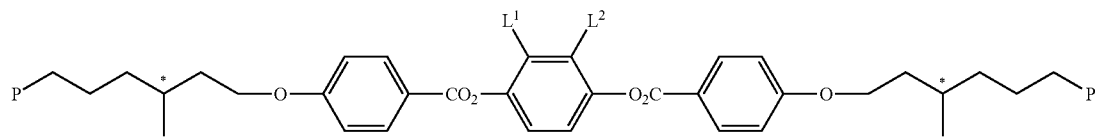
(R20)

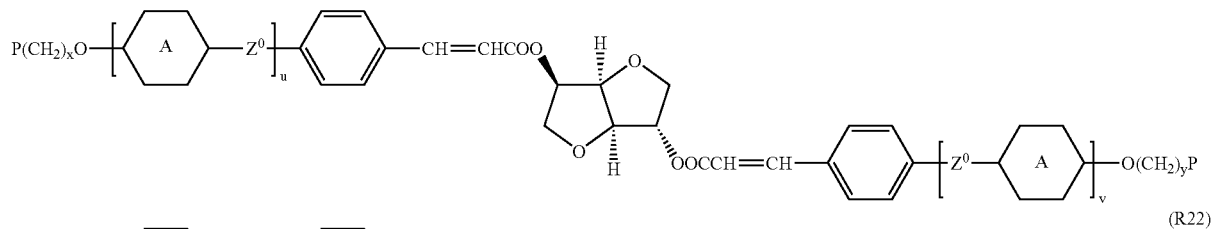
(R21)

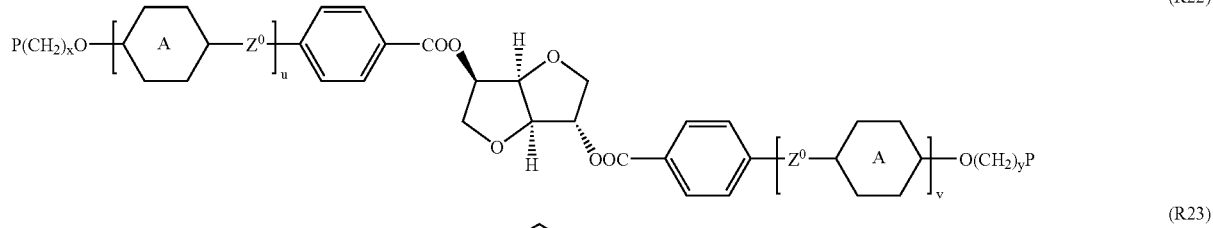
(R22)

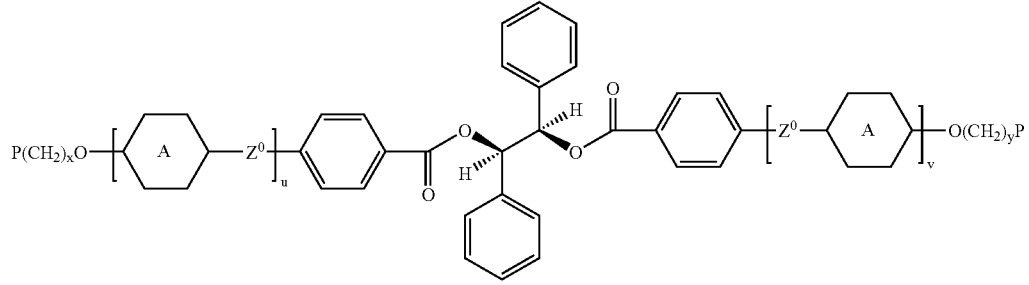
(R23)

In the above formulae, P is a polymerisable group, preferably an acryl, methacryl, vinyl, vinyloxy, propenyl ether, epoxy, oxetane or styryl group, x and y are identical or different integers from 1 to 12, A is 1,4-phenylene that is optionally mono-, di- or trisubstituted by $L^1$, or 1,4-cyclohexylene, u and v are independently of each other 0 or 1, $Z^0$ is —COO—, —OCO—, —CH$_2$CH$_2$—, —CH=CH—, —C≡C— or a single bond, $R^0$ is a polar group or an unpolar group, Ter is a terpenoid radical like e.g. menthyl, Chol is a cholesteryl group, L, $L^1$ and $L^2$ are independently of each other H, F, Cl, CN or an optionally halogenated alkyl, alkoxy, alkylcarbonyl, alkylcarbonyloxy, alkoxycarbonyl or alkoxycarbonyloxy group with 1 to 7 C atoms, and r is 0, 1, 2, 3 or 4. The phenyl rings in the above formulae are optionally substituted by 1, 2, 3 or 4 groups L.

The term 'polar group' in this connection means a group selected from F, Cl, CN, NO$_2$, OH, OCH$_3$, OCN, SCN, an optionally fluorinated alkycarbonyl, alkoxycarbonyl, alkylcarbonyloxy or alkoxycarbonyloxy group with up to 4 C atoms or a mono- oligo- or polyfluorinated alkyl or alkoxy group with 1 to 4 C atoms. The term 'unpolar group' means an optionally halogenated alkyl, alkoxy, alkycarbonyl, alkoxycarbonyl, alkylcarbonyloxy or alkoxycarbonyloxy group with 1 or more, preferably 1 to 12 C atoms which is not covered by the above definition of 'polar group'.

The polymerisable LC material preferably comprises one or more monoreactive polymerisable mesogenic compounds and one or more di- or multireactive polymerisable mesogenic compounds.

A preferred polymerisable LC material comprises
   5-70%, preferably 5-50%, very preferably 5-40% by weight of one or more direactive achiral mesogenic compounds,
   30-95% preferably 50-75% by weight of one or more monoreactive achiral mesogenic compounds,
   0 to 10% by weight of one or more photoinitiators.

The monoreactive achiral compounds are preferably selected from above formulae R1-R13, in particular R1, R5 and R12 wherein v is 1.

The direactive achiral compounds are preferably selected from above formulae R18.

Especially preferred are mixtures comprising one or more polymerisable compounds comprising an acetylene or tolane group with high birefringence, like e.g. compounds of formula Ig above. Suitable polymerisable tolanes are described for example in GB 2,351,734.

For the preparation of planar films with helically twisted structure, the polymerisable LC material preferably comprises one or more achiral polymerisable mesogenic compounds and at least one chiral compound. The chiral compound can be selected from non-polymerisable chiral compounds, like e.g. conventional chiral dopants, polymerisable chiral non-mesogenic or polymerisable chiral mesogenic compounds.

Suitable chiral dopants can be selected e.g. from the commercially available R- or S-811, R- or S-1011, R- or S-2011, R- or S-3011, R- or S4011, R- or S-5011, or CB 15 (from Merck KGaA, Darmstadt, Germany). Very preferred are chiral compounds with a high helical twisting power (HTP), in particular compounds comprising a sorbitol group as described in WO 98/00428, compounds comprising a hydrobenzoin group as described in GB 2,328,207, chiral binaphthyl derivatives as described in WO 02/94805, chiral binaphthol acetal derivatives as described in WO 02/34739, chiral TADDOL derivatives as described in WO 02/06265, and chiral compounds having at least one fluorinated linkage group and a terminal or central chiral group as described in WO 02/06196 and WO 02/06195.

The polymerisable material is preferably dissolved or dispersed in a solvent, preferably in an organic solvent. The solution or dispersion is then coated onto the substrate, for example by spin-coating or other known techniques, and the solvent is evaporated off before polymerisation. In most cases it is suitable to heat the mixture in order to facilitate the evaporation of the solvent.

The polymerisable LC material may additionally comprise a polymeric binder or one or more monomers capable of forming a polymeric binder and/or one or more dispersion auxiliaries. Suitable binders and dispersion auxiliaries are disclosed for example in WO 96/02597. Especially preferred, however, are LC materials not containing a binder or dispersion auxiliary.

In another preferred embodiment the polymerisable LC material comprises an additive that induces or enhances planar alignment of the liquid crystal material on the substrate. Preferably the additive comprises one or more surfactants. Suitable surfactants are described for example in J. Cognard, Mol. Cryst. Liq. Cryst. 78, Supplement 1, 1-77 (1981). Particularly preferred are non-ionic surfactants, very fluorocarbon surfactants, like for example the commercially available fluorocarbon surfactants Fluorad FC-171® (from 3M Co.), or Zonyl FSN® (from DuPont).

Polymerisation of the LC material is preferably achieved by exposing it to actinic radiation. Actinic radiation means irradiation with light, like UV light, IR light or visible light, irradiation with X-rays or gamma rays or irradiation with high energy particles, such as ions or electrons. Preferably polymerisation is carried out by photoirradiation, in particular with UV light. As a source for actinic radiation for example a single UV lamp or a set of UV lamps can be used. When using a high lamp power the curing time can be reduced. Another possible source for photoradiation is a laser, like e.g. a UV laser, an IR laser or a visible laser.

Polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. UV photoinitiators are preferred, in particular radicalic UV photoinitiators. As standard photoinitiator for radical polymerisation for example the commercially available Irgacure® 907, Irgacure® 651, Irgacure® 184, Darocure® 1173 or Darocure® 4205 (all from Ciba Geigy AG) can be used, whereas in case of cationic photopolymerisation the commercially available UVI 6974 (Union Carbide) can be used.

The polymerisable LC material can additionally comprise one or more other suitable components such as, for example, catalysts, sensitizers, stabilizers, chain-transfer agents, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

In another preferred embodiment the polymerisable material comprises up to 70%, preferably 1 to 50% of a monoreactive non-mesogenic compound with one polymerisable functional group. Typical examples are alkyl acrylates or alkyl methacrylates with alkyl groups of 1 to 20 C atoms.

It is also possible, in order to increase crosslinking of the polymers, to add up to 20% of a non-mesogenic compound with two or more polymerisable functional groups to the polymerisable LC material alternatively or in addition to the di- or multireactive polymerisable mesogenic compounds to increase crosslinking of the polymer. Typical examples for direactive non-mesogenic monomers are alkyl diacrylates or alkyl dimethacrylates with alkyl groups of 1 to 20 C atoms. Typical examples for multireactive non-mesogenic monomers are trimethylpropane trimethacrylate or pentaerythritol tetraacrylate.

It is also possible to add one or more chain transfer agents to the polymerisable material in order to modify the physical properties of the polymer film. Especially preferred are thiol compounds, such as monofunctional thiol compounds like e.g. dodecane thiol or multifunctional thiol compounds like e.g. trimethylpropane tri(3-mercaptopropionate), very preferably mesogenic or liquid crystalline thiol compounds. When adding a chain transfer agent, the length of the free polymer chains and/or the length of the polymer chains between two crosslinks in the inventive polymer film can be controlled. When the amount of the chain transfer agent is increased, the polymer chain length in the obtained polymer film is decreasing.

The optical retardation film according to the present invention can be used as retardation or compensation film in conventional LCDs, in particular TN, HTN (highly twisted nematic), STN, AMD-TN (active matrix driven TN) or IPS displays, furthermore in displays of the DAP (deformation of aligned phases) or VA mode, like ECB, CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like OCB, R-OCB (reflective OCB), HAN (hybrid aligned nematic) or pi-cell ($\pi$-cell) displays, in SSCT displays, furthermore in displays of the isotropic mode or new mode as described above.

Especially preferred are AMD-TN, VA and IPS displays.

The following examples shall illustrate the invention without limiting it.

EXAMPLE 1

Optical Retardation Film Coated Onto Colour Filter Material

Glass substrates were coated with commercial colour filter material (available from Hitachi Chemicals or JSR company) by applying the colour filter solution to the glass and spin-coating at 600 rpm for 30 seconds. The samples were then heated on a hotplate at 100° C. for 1 minute (pre-curing stage)

and then transferred to an oven at 250° for 1 hour. This resulted in a polymerised colour filter layer of approximately 0.9 μm thickness in the case of Hitachi Chemical colour filter samples, and 0.45 μm thickness in the case of JSR materials.

The colour filter samples on glass were then rubbed with a velvet cloth according to conventional practice for LC alignment, giving a total rubbing length of 66 cm.

The polymerisable LC mixture M1 was formulated as follows

|  |  |
|---|---|
| 1) | 39.4% |
| (2) | 24.6% |
| (3) | 24.6% |
| (4) | 9.8% |
| Irgacure 651 | 1.0% |
| Fluorad FC171 | 0.6% |

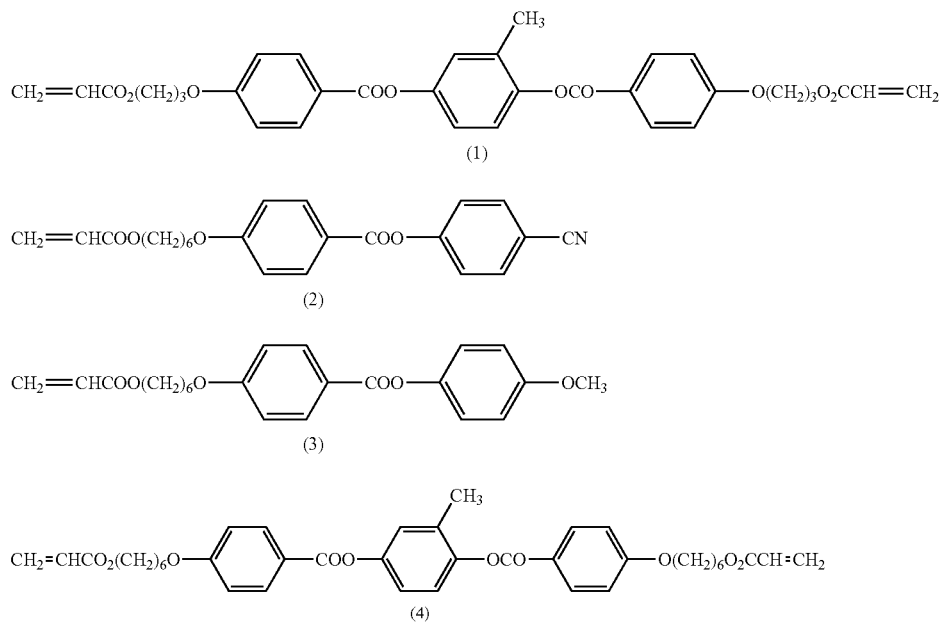

The direactive compounds (1) and (4) can be prepared as described in WO 93/22397. The monoreactive compounds (2) and (3) can be prepared according to or in analogy to the methods described in D. J. Broer et al., Makromol. Chem. 190, 3201-3215 (1989). Irgacure 651 is a commercially available photoinitiator (from Ciba AG, Basel, Switzerland). Fluorad FC 171 is a commercially available non-ionic fluorocarbon surfactant (from 3M).

A solution of mixture M1 in organic solvent PGMEA was then applied to the surface of the colour filter and spin coated at 300 rpm for 30 seconds. The samples were allowed to stand for a further 30 seconds at room temperature to ensure alignment of the reactive mesogen material before exposing to ultra violet light from a medium pressure mercury arc lamp 20 mW/cm² for 60 seconds to polymerise the reactive mesogen layer.

The resulting samples showed quarter wave retardation properties with good planar alignment and retardation of approximately 150 nm. Indium tin oxide could then be coated directly onto the retardation layer by evaporation according to standard practice, for example by evaporation at 180° C. under vacuum to provide a transparent electrode layer. An alignment layer such as commercially available polyimide from JSR, for example AL1054, is then applied to the ITO layer by spin coating at 3000 rpm for 30 seconds, dried at 100° C. for 60 seconds, and imidised by baking at 180° C. for 90 minutes.

The polyimide layer is then rubbed with a velvet cloth (22 cm rub length) and the completed stack can be used as one side of a LC display, like the lower side of the display shown in FIG. 3.

EXAMPLE 2

Optical Retardation Film Coated Onto Planarisation Layer

Samples of colour filter on glass were prepared as in example 1, and additionally were coated with a commercial planarisation layer Topcoat from JSR company by spin-coating at 600 rpm for 30 seconds. The samples were then heated on a hotplate at 100° C. for 1 minute (pre-curing stage) and then transferred to an oven at 250° for 1 hour.

The colour filter samples on glass were then rubbed with a velvet cloth according to conventional practice for LC alignment, giving a total rubbing length of 66 cm.

A solution of mixture M1 of example 1 in organic solvent PGMEA was then applied to the surface of the planarisation layer and spin coated at 3000 rpm for 30 seconds. The samples were allowed to stand for a further 30 seconds at room temperature to ensure alignment of the reactive mesogen material before exposing to ultra violet light from a medium pressure mercury arc lamp 20 mW/cm² for 60 seconds to polymerise the reactive mesogen layer.

The resulting samples showed quarter wave retardation properties with good planar alignment and retardation of approximately 150 nm.

Indium tin oxide could then be coated directly onto the retardation layer by evaporation according to standard practice, for example by evaporation at 180° C. under vacuum to provide a transparent electrode layer. An alignment layer such as commercially available polyimide from JSR, for example AL1054, is then applied to the ITO layer by spin coating at 300 rpm for 30 seconds, dried at 100° C. for 60 seconds, and imidised by baking at 180° C. for 90 minutes.

The polyimide layer is then rubbed with a velvet cloth (22 cm rub length) and the completed stack can be used as one side of a LC display like the lower side of the display shown in FIG. 2.

EXAMPLE 3

Biaxial Optical Retardation Film Coated Onto Colour Filter

The polymerisable LC mixture M2 was formulated as follows

| | |
|---|---|
| (5) | 63.0% |
| (4) | 20.0% |
| (6) | 7.8% |
| (7) | 5.0% |
| (8) | 2.0% |
| (9) (photoinitiator) | 2.0% |
| FC171 | 0.2% |

The prepaaration of the chiral dopant (7) is described in EP 01111954.2.

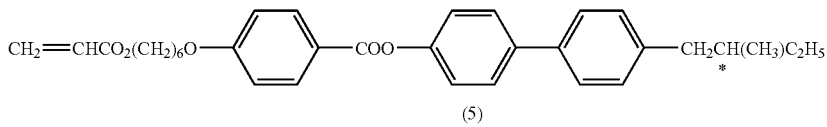

(5)

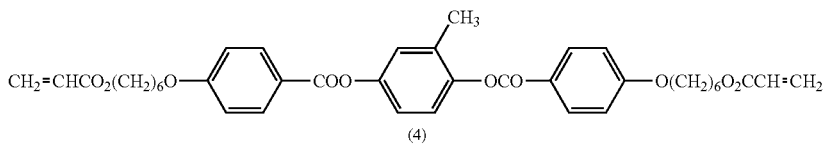

(4)

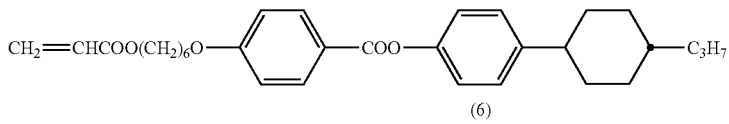

(6)

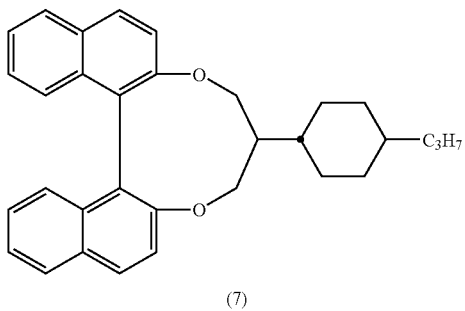

(7)

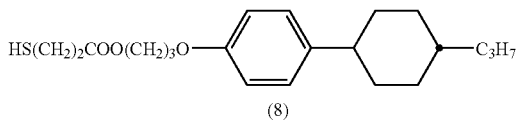

(8)

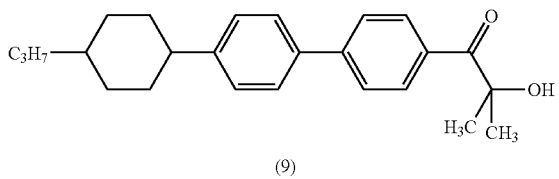

(9)

The mixture was dissolved in 7:3 toluene/cyclohexanone to give a 50% w/w solution. The solution was applied to the surface of a colour filter as described in example 1 and polymerised at 80° C. by exposing to 0.8 mWcm$^{-2}$ of linearly polarised UV (365 nm) irradiation to give a cholesteric film having a deformed helix with an elliptical refractive index ellipsoid that is optically biaxial with $n_x$, $n_y$>$n_z$.

The invention claimed is:

1. A liquid crystal display (LCD) comprising a liquid crystal (LC) cell formed by two plane parallel substrates at least one of which is transparent to incident light, a liquid crystal medium which is present between the two substrates, and at least one optical retardation film, wherein at least one of said optical retardation films is positioned inside the switchable liquid crystal cell of said LCD, and between the two substrates of the LC cell, said LCD further comprising a color filter array provided on one of said substrates, wherein said at least one optical retardation film is positioned between the color filter and the LC medium.

2. An LCD comprising
   1) a liquid crystal (LC) cell comprising the following elements, starting from the edges to the centre of the cell in the sequence listed below
      a) a first and a second substrate plane (11*a*, 11*b*) parallel to each other, at least one of which is transparent to incident light,
      b) optionally an array of nonlinear elements (12) on one of said substrates which can be used to individually switch individual pixels of said LC cell,
      c) a color filter array (13) provided on one of said substrates, said color filter optionally being covered by a planarization layer (14),
      d) a first electrode layer (15*a* or 15*b*) provided on the inside of said first substrate,
      e) optionally a second electrode layer (15*a* or 15*b*) provided on the inside of said second substrate,
      f) optionally first and second alignment layers (16*a* or 16*b*) provided on said first and second electrodes,
      g) an LC medium (17) that is switchable between at least two different states by application of an electric field,
   2) a first linear polarizer on one side of the LC cell,
   3) optionally a second linear polarizer on the side of the LC cell opposite to that of the first linear polarizer,
   4) at least one optical retardation film (18),
wherein at least one of said optical retardation films is positioned between the first and second substrate (11*a*, 11*b*) of the LC cell, between the color filter and the LC medium.

3. An LCD according to claim 2, comprising a color filter array (13) being covered by a planarization layer (14), and said at least one optical retardation film (18) is positioned on the side of the planarization layer facing away from the color filter array (13).

4. An LCD according to claim 2, comprising a color filter array (13), and said at least one optical retardation film (18) is positioned on the side of the color filter array facing away from the nearest substrate and is optionally covered by a planarization layer (14).

5. An LCD according to claim 3, wherein the optical retardation film (18) is directly prepared on the color filter array (13) or on the planarization layer (14).

6. An LCD according to claim 1, wherein the optical retardation film comprises polymerized or crosslinked LC material.

7. An LCD according to claim 6, wherein the optical retardation film is prepared from a polymerizable LC material comprising one or more polymerizable mesogenic or LC monomers.

8. An LCD according to claim 7, wherein the polymerizable LC material comprises
   5-70% by weight of one or more direactive achiral mesogenic compounds,
   30-95% of one or more monoreactive achiral mesogenic compounds,
   0 to 10% by weight of one or more photoinitiators.

9. An LCD according to claim 7, wherein LC material comprises at least one non-polymerizable chiral compound, polymerizable chiral non-mesogenic compound or polymerizable chiral mesogenic compound.

10. An LCD according to claim 7, wherein the LC material comprises at least one compound selected from photoisomerizable compound or phototunable chiral compound.

11. An LCD according to claim 7, wherein the LC material comprises one or more compounds selected from the following formulae

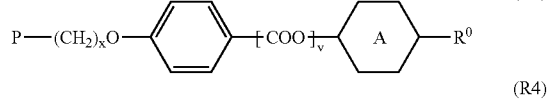

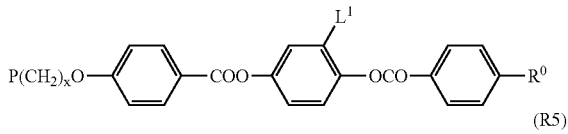

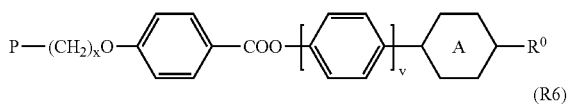

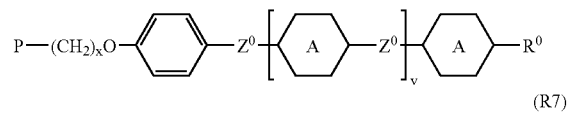

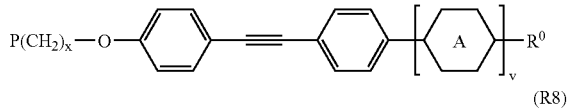

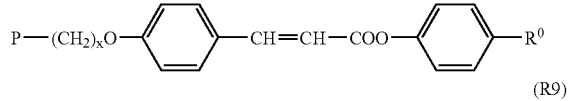

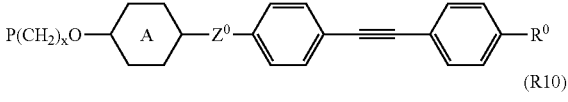

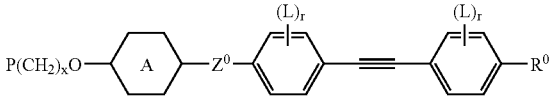

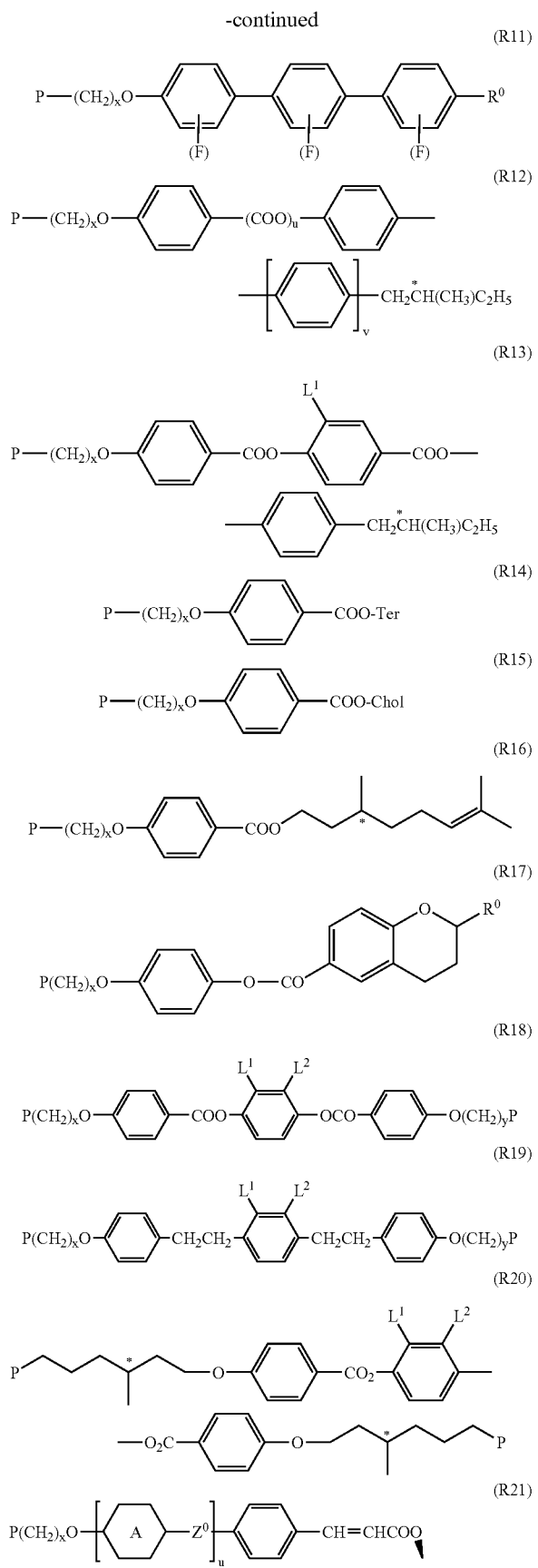
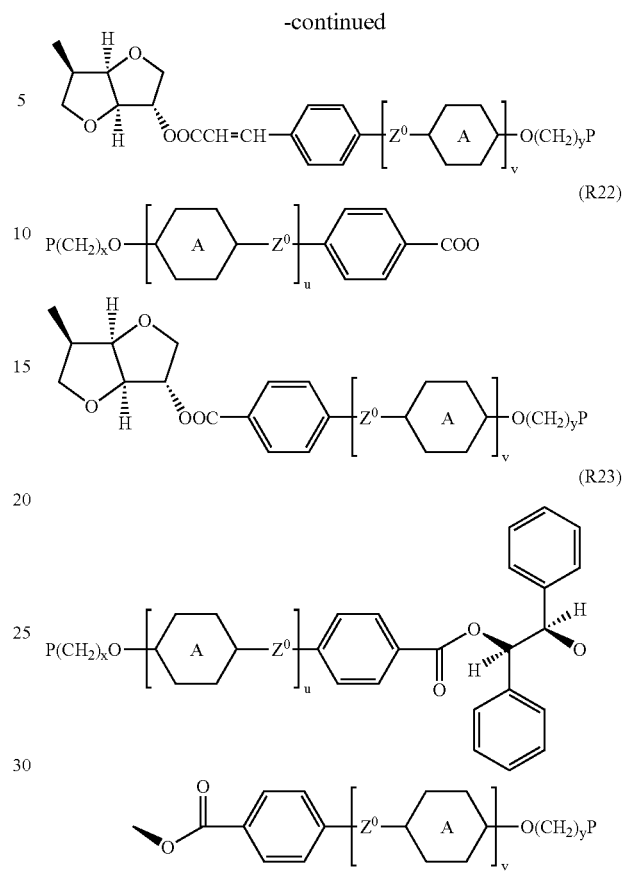

wherein
P is a polymerizable group,
x and y are identical or different integers from 1 to 12,
A is 1,4-phenylene that is optionally mono-, di- or trisubstituted by $L^1$, or 1,4-cyclohexylene,
u and v are independently of each other 0 or 1,
$Z^0$ is —COO—, —OCO—, —CH$_2$CH$_2$—, —CH=CH—, —C≡C— or a single bond,
$R^0$ is a polar group which is F, Cl, CN, NO$_2$, OH, OCH$_3$, OCN, SCN, an optionally fluorinated alkycarbonyl, alkoxycarbonyl, alkylcarbonyloxy or alkoxycarbonyloxy group with up to 4 C atoms or a mono- oligo- or polyfluorinated alkyl or alkoxy group with 1 to 4 C atoms, or is a non-polar group which is optionally halogenated alkyl, alkoxy, alkycarbonyl, alkoxycarbonyl, alkylcarbonyloxy or alkoxycarbonyloxy group with 1 or more C atoms which is not one of the polar groups above,
Ter is a terpenoid radical,
Chol is a cholesteryl group, L, $L^1$ and $L^2$ are independently of each other H, F, Cl, CN or an optionally halogenated alkyl, alkoxy, alkylcarbonyl, alkylcarbonyloxy, alkoxycarbonyl or alkoxycarbonyloxy group with 1 to 7 C atoms, and r is 0, 1, 2, 3 or 4
and wherein the phenyl rings are optionally substituted by 1, 2, 3 or 4 groups L.

12. An LCD according to claim 1, wherein the optical retardation film is a planar, homeotropic, tilted, splayed, twisted or cholesteric film.

13. An LCD according to claim 1, wherein the optical retardation film has a twisted or cholesteric structure with a pitch of less than 250 nm.

14. An LCD according to claim 1, wherein the optical retardation film is a positive or negative A, O or C plate.

15. An LCD according to claim 1, wherein the optical retardation film is a quarter wave retardation film.

16. An LCD according to claim 1, wherein the optical retardation film is an optically biaxial film.

17. An LCD according to claim 1, wherein the optical retardation film is a biaxial film having a cholesteric structure which has optically biaxial negative C symmetry with $n_x \neq n_y \neq n_z$ and $n_x, n_y > n_z$, wherein $n_x$ and $n_y$ are the principal refractive indices in orthogonal directions in the film plane and $n_z$ is the principal refractive index perpendicular to the film plane.

18. An LCD according to claim 1, wherein the optical retardation film has a pattern comprising at least two regions having different orientation and/or different retardation.

19. An LCD according to claim 1, which is a display of TN, HTN, STN, AMD-TN, IPS, DAP, VA, ECB, CSH, VAN, VAC, MVA, PVA, OCB, R-OCB, HAN, pi-cell, SSCT, isotropic or new mode.

* * * * *

UNITED STATES PATENT AND TRADEMARK OFFICE
CERTIFICATE OF CORRECTION

PATENT NO. : 7,582,227 B2 Page 1 of 1
APPLICATION NO. : 10/552711
DATED : September 1, 2009
INVENTOR(S) : Verall et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this

Fourteenth Day of September, 2010

David J. Kappos
*Director of the United States Patent and Trademark Office*